April 9, 1929.   B. R. LOOTS ET AL   1,708,922
TRACTOR WAGON HITCH FOR CORN HUSKERS
Filed Dec. 30, 1927   2 Sheets-Sheet 1
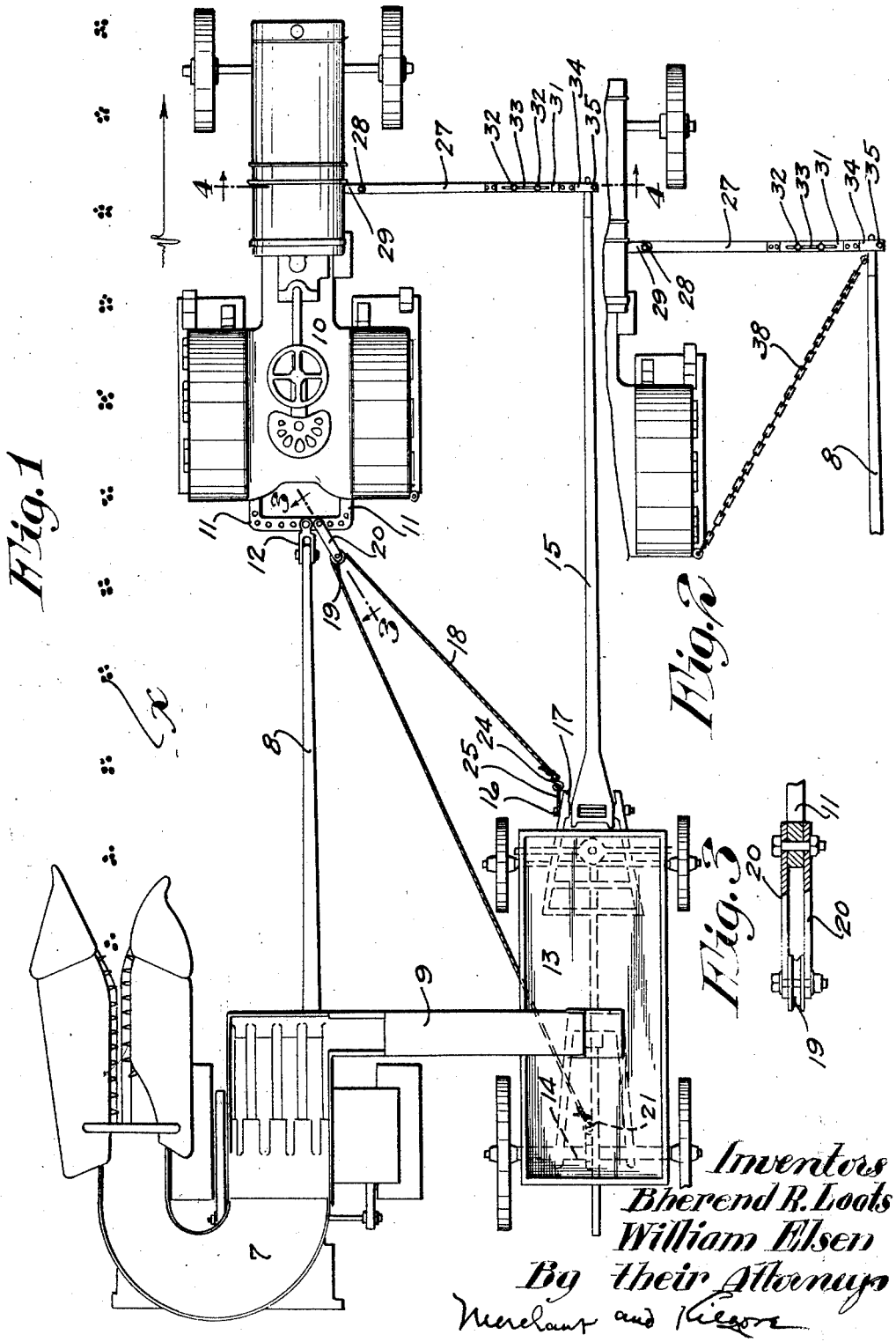

April 9, 1929.   B. R. LOOTS ET AL   1,708,922
TRACTOR WAGON HITCH FOR CORN HUSKERS
Filed Dec. 30, 1927   2 Sheets-Sheet 2
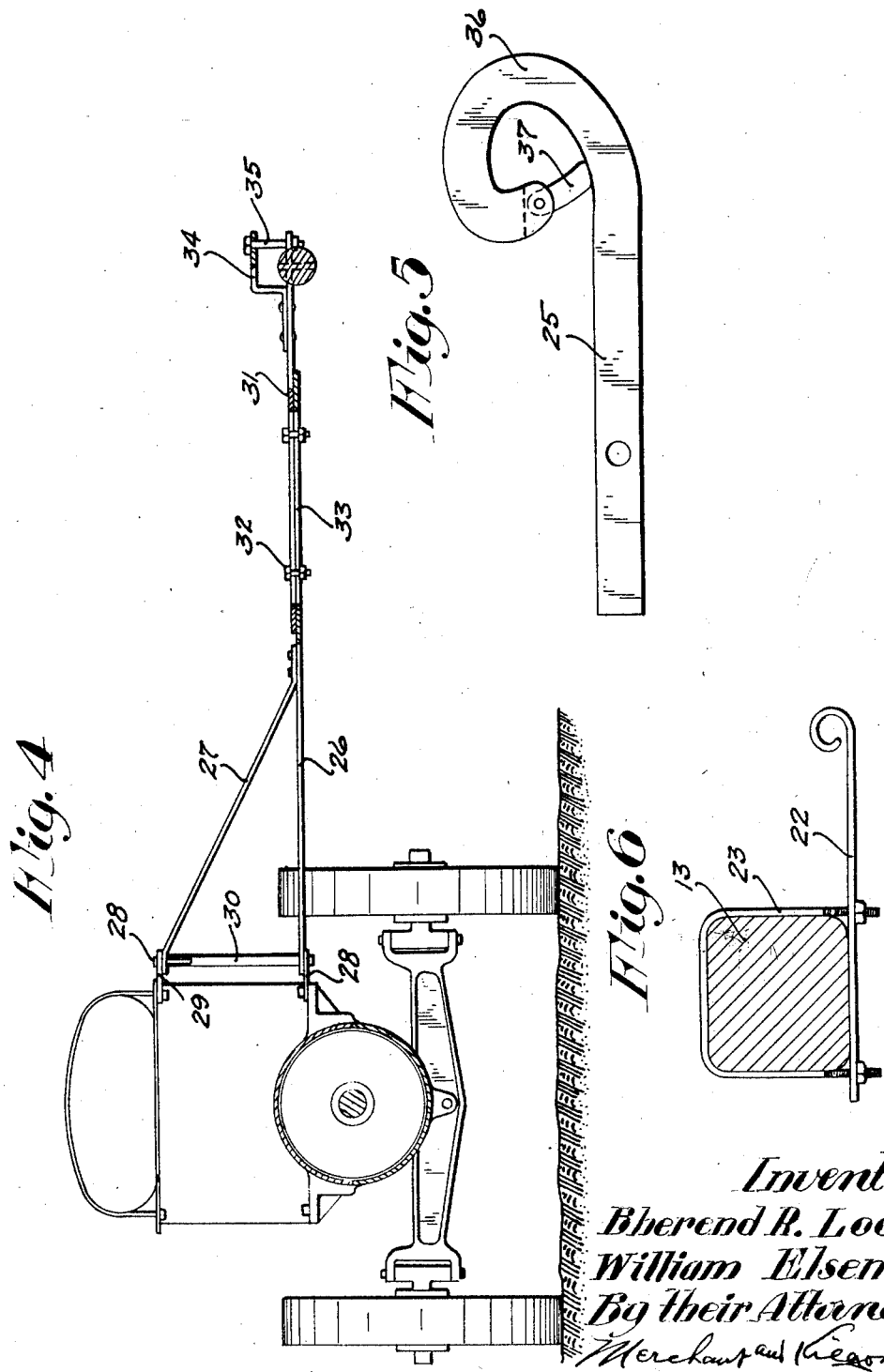

Patented Apr. 9, 1929.

1,708,922

UNITED STATES PATENT OFFICE.

BHEREND R. LOOTS AND WILLIAM ELSEN, OF PALMER, IOWA.

TRACTOR WAGON HITCH FOR CORN HUSKERS.

Application filed December 30, 1927. Serial No. 243,566.

Our invention has for its object to provide a simple and highly efficient tractor, wagon hitch for corn huskers, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a plan view of a tractor, a corn husker, a wagon, and the tractor, wagon hitch;

Fig. 2 is a fragmentary view showing an attachment for holding the wagon from getting out of position in respect to the corn husker when going downgrade;

Fig. 3 is a detail view of the equalizer with some parts sectioned on the line 3—3 of Fig. 1, on an enlarged scale;

Fig. 4 is a rear elevation with some parts sectioned on the line 4—4 of Fig. 1, on an enlarged scale;

Fig. 5 is a view in side elevation of the wagon tongue tip; and

Fig. 6 is a detail view of the attachment for securing the hitch to the rear axle of the wagon, said axle being shown in section.

The numeral 7 indicates a corn husker as an entirety with the exception of its tongue 8 and elevator 9. Said corn husker 7, as shown, is drawn by a tractor 10 having a rear transverse draft bar 11 to which the tongue 8 of said corn husker is attached by a clevis 12. The clevis 12 is attached to the draft bar 11 for adjustment transversely of the tractor 10 so as to cause the corn husker 7 to follow said tractor in the row of corn $x$.

Corn from the elevator 9 is discharged into the box of a wagon at substantially the longitudinal and transverse center thereof. The wagon is indicated as an entirety by the numeral 13 with the exception of its rear axle 14 and tongue 15. Said tongue 15 is attached by a bolt 16 to the hounds 17 of the front axle structure in a manner to impart angular steering movements thereto.

The wagon 13 is drawn by the tractor by means of the improved equalizing hitch which includes a cable 18, the intermediate portion of which is arranged to run over a pulley 19 journaled to and between a pair of vertically spaced bars 20 pivoted to the draft bar 11 on the tractor 10 for horizontal swinging movement. The inner end portions of the cable 18 are in diverging relation to afford a rear leg attached to the body of the wagon 13 and a front leg attached to the front axle structure. As one means of attaching the rear leg of the cable 18 to the wagon 13, the same is provided with a hook 21 detachably interlocked with an eye bar 22 rigidly secured to the rear axle 13 by a U-shaped bolt 23. As shown, the front leg of the cable 18 is attached to the front axle structure by a hook 24 separably interlocked with an eye bar 25 on the bolt 16.

The length of the cable 18 is such as to hold the wagon 13 in a predetermined position in respect to the corn husker 7 so that the delivery end of the elevator 9 is directly over the box on said wagon. Obviously, the lateral swinging movement of the pulley 19 and the travel of the cable 18 over said pulley compensates for angular steering movements of the tractor 10 in respect to the corn husker 7. The wagon tongue 15 is attached to the tractor 10 for angular steering movements therewith by means of a horizontal arm 26 having an oblique supporting brace 27. Said arm 26 and brace 27 are pivoted to a vertical bolt 28 for horizontal swinging movement and which bolt is mounted in a pair of vertically spaced bearing lugs 29 on the right side of the tractor 10. The inner ends of the arm 26 and brace 27 are held laterally spaced by a thimble 30 on the bolt 28.

The arm 26 extends laterally from the tractor 10 and has on its outer end an extension 31 adjustably secured thereto by a pair of nut-equipped bolts 32 which project through coincident longitudinally extended slots 33 in said arm and extension. Rigidly secured to the arm extension 31 is a prong 34 overlying and vertically spaced from said extension. A nut-equipped bolt 35 is inserted through aligned bores in the arm extension 31 and prong 34. The arm extension 31 is detachably secured to a tip on the tongue 15. This tongue tip is in the form of a hook 36, the shank of which is rigidly secured to said tongue. The arm extension 31 between the vertical portion of its prong 34 and the bolt 35 extends through the hook 36 and is held interlocked with said hook by a gravity-held dog 37 pivoted to said hook.

To detach the arm extension 31 from the hook 36 it is only necessary to lift the lock dog 37 and disengage the arm extension 31 from said hook. To detach the wagon 13 from the tractor 10 when the box on said wagon is full of corn, it is only necessary to release the hooks 21 and 24 of the equalizer from the wagon 13 and lift the lock dog 37 to permit the tongue 15 to be detached from the arm extension 31. When the arm extension 31 is detached from the tongue 15 the arm 26 may be swung laterally against the side of the tractor 10 so as to be out of the way when travelling along a highway or through a gate opening.

When the above described outfit is operating in an ordinary level field, the arm 26 is free to swing laterally, but when operating in a hilly field a chain 38 is used to connect the outer end of the tongue 15 to the rear end of the tractor 10, as shown in Fig. 2, to hold the wagon from running forward out of its proper position in respect to the elevator 9.

What we claim is:

1. The combination with a corn husker having an elevator, a tractor attached to the corn husker for angular steering movements in respect thereto, and a wagon, of an equalizing hitch on the tractor having a pair of legs, one of which is attached to the body of the wagon and the other of which is attached to the front axle structure of the wagon, said hitch being arranged to cause the wagon to travel in a position to receive from the elevator of the corn husker.

2. The combination with a corn husker having an elevator, a tractor attached to the corn husker for angular steering movements in respect thereto, and a wagon having a tongue for imparting angular steering movements to the front axle structure of the wagon, of an equalizing hitch on the tractor having a pair of legs, one of which is attached to the body of the wagon and the other of which is attached from the axle structure thereof, said hitch being arranged to cause the wagon to travel in a position to receive from the elevator of the corn husker.

3. The structure defined in claim 2 in further combination with the connection from the tractor to the tongue of the wagon for causing the wagon to partake of like angular steering movements with the tractor.

4. The structure defined in claim 2 in further combination with an arm hinged to the tractor for horizontal swinging movement and projecting laterally therefrom, and a coupling connecting the arm to the tongue of the wagon.

5. The structure defined in claim 2 in further combination with a longitudinally adjustable arm hinged to the tractor for horizontal swinging movement and projecting laterally therefrom, and a coupling connecting the arm to the tongue of the wagon.

6. The structure defined in claim 2 in further combination with an arm hinged to the tractor for horizontal swinging movement and projecting laterally therefrom, a coupling connecting the arm to the tongue of the wagon, and a connection from the tractor for holding the arm against forward swinging movement.

7. The combination with a corn husker having an elevator, a tractor attached to the corn husker for angular steering movements in respect thereto, and a wagon, of an equalizing hitch for attaching the wagon to the tractor comprising a pulley mounted on the tractor for horizontal swinging movement, a cable arranged to run over said pulley with its end portions in diverging relation, one end of said cable being attached to the body of the wagon and the other end thereof being attached to the front axle structure of the wagon, said equalizing hitch being arranged to cause the wagon to travel in a position to receive from the elevator of the corn husker.

In testimony whereof we affix our signatures.

BHEREND R. LOOTS.
WILLIAM ELSEN.